United States Patent [19]
Ward et al.

[11] Patent Number: 4,925,284
[45] Date of Patent: May 15, 1990

[54] ORBITAL SUPPORT STRUCTURE FOR MICROMANIPULATORS USED WITH COMPOUND MICROSCOPES

[76] Inventors: Frank Ward, 20910 NE. 156th St., Woodinville, Wash. 98072; William J. Moody, 6746-2nd Ave. NW., Seattle, Wash. 98117

[21] Appl. No.: 227,352
[22] Filed: Aug. 2, 1988
[51] Int. Cl.$^5$ ............................................. G02B 21/32
[52] U.S. Cl. .................................... 350/532; 350/529
[58] Field of Search ................ 350/529, 530, 531, 532

[56] References Cited

U.S. PATENT DOCUMENTS 3,179,260  4/1965  Ferlen .................................. 350/532

Primary Examiner—Bruce Y. Arnold
Assistant Examiner—Ronald M. Kachmarik
Attorney, Agent, or Firm—Graybeal, Jensen & Puntigam

[57] ABSTRACT

A base element (10) is fixedly mounted to a microscope. The upper surface (18) of an annular mounting portion (15) at the top of base element (10) is flat and forms a track which extends around the vertical centerline, i.e. the optical axis of the microscope. Movably secured to the upper surface (18) of the annular mounting portion (15) is a positioner element (28). The positioner element (28) includes a portion (46) which is movable toward and away from the centerline of the microscope (12). On the top surface of the movable portion (46) is a translator element (64) which is rotatable relative to the positioner element (28). A micromanipulator (73), which is a microscope accessory, is mountable on the translator (64). The apparatus as a whole provides a stable platform for support and movement of a plurality of micromanipulators.

9 Claims, 2 Drawing Sheets

ORBITAL SUPPORT STRUCTURE FOR MICROMANIPULATORS USED WITH COMPOUND MICROSCOPES

TECHNICAL FIELD

This invention relates generally to the art of microscopes and more particularly concerns a microscope accessory which serves as a stable support or platform for apparatus known as a micromanipulator which is used with a microscope to carry out particular experiments.

BACKGROUND ART

In certain types of cellular investigations carried out with the aid of a microscope, it is necessary to make physical contact with the cell, such as for example to make electrical measurements or to inject selected substances into the cell. Various forms of probes are used to perform such functions, and these probes must be carefully supported and manipulated in order to perform the required function, without in any way damaging or otherwise altering the cell. The apparatus which holds and moves such probes is generally referred to in the art as a micromanipulator, and can be purchased commercially from a number of different sources. For proper operation, the micromanipulator must be mounted on a stable support element or platform, so that the necessary minute adjustments of the probes which are accomplished by the micrometer-adjustable manipulator are accurate and reproducible.

In the past, mounting structures for micromanipulators have been relatively crude, and typically not very stable in operation, or they have been extremely sophisticated and expensive devices which are rather limited in their usefulness and flexibility. Most existing mounting devices are capable of supporting only a single micromanipulator. A plurality of separate support devices thus must be used if more than one micromanipulator is to be used in a particular experiment, or if the angular position of the single micromanipulator relative to the cell needs to be changed, as there typically is no capability of conveniently moving the micromanipulator relative to the mounting structure. In addition, most existing mounting devices require extensive modification to accommodate micromanipulators from different manufacturers.

Thus, there is a significant need for a mounting structure for microscope micromanipulators which is stable, simple to operate, and has a significant amount of operational capability and flexibility.

DISCLOSURE OF THE INVENTION

Accordingly the present invention includes an apparatus which is used with a microscope for mounting one or more micromanipulators which are capable of carrying an electrical probe or the like. The apparatus includes a base element which is supported in such a manner that it is stable relative to the microscope, the base element including a track portion which extends around a substantial portion of the "stage" portion of the microscope. The apparatus further includes a positioning element which is capable of being mounted on the track portion so that in operation the positioning element can be moved along the track portion, the positioning element including a portion which is movable relative to the remainder of the positioning element, both toward and away from the microscope stage. Further, the apparatus includes means on the movable portion of the positioning element for supporting a micromanipulator, wherein the supporting means is rotatable relative to the movable portion of the positioning element.

BEST MODE FOR CARRYING OUT THE INVENTION

Figure 1:
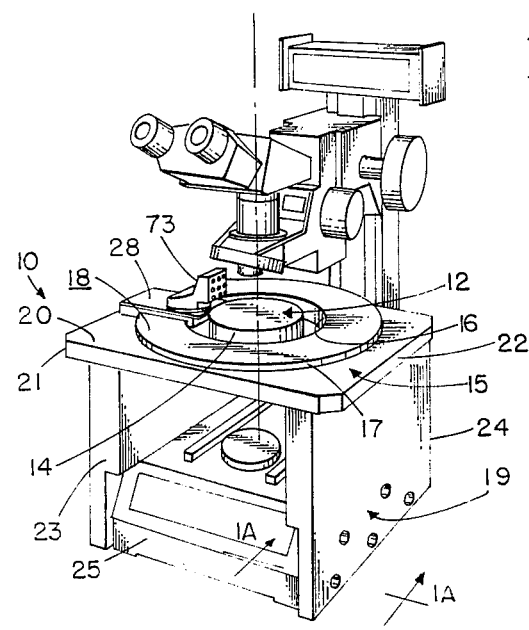
FIG. 1 is an isometric view of the micromanipulator support platform, i.e. mounting structure, of the present invention in position relative to a microscope.

FIG. 1 shows the micromanipulator support platform of the present invention relative to a conventional upright microscope. The micromanipulator support platform includes a base element shown generally at 10, which surrounds the microscope centerline 12, i.e. the optical axis (optical centerline) of the microscope, and the microscope stage 14. Mounted on the microscope stage 14 in conventional fashion, either for an upright or an inverted microscope, is the element or article being investigated (not shown). Typically, this might include one or a number of individual cells of a selected animal, plant or the like.

In the embodiment shown, the base element 10 includes an annular mounting portion 15 at the top thereof. The inner edge 16 of the mounting portion 15 is approximately $6\frac{1}{2}$ inches in diameter, while the outer edge 17 is approximately 11.3 inches. These dimensions could, of course, vary. The upper surface 18 of the mounting portion 15 is flat, and is approximately 4.7 inches wide.

Figure 1A:
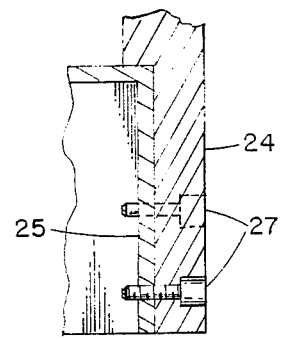
FIG. 1a is a cross-sectional view showing the manner of attachment of the support platform to the microscope.

The annular mounting portion 15 is approximately $\frac{3}{8}$ inches high in the embodiment shown and is supported on a table-like element 19 which includes a flat, horizontal support surface 20 which in the embodiment shown is approximately square in outline, 14 inches on a side. Extending downwardly from support surface 20 at the side ends 21, 22 thereof are vertical support members 23, 24 which in the embodiment shown are 9 inches wide and 8–9 inches high, depending on the focal length of the microscope lens. The support surface 20 is secured to the top edge of support members 23, 24 by screws or the like. The support members 23, 24 in turn are secured to the base portion 25 of the microscope itself by screws 27 or the like, as shown in FIG. 1A. Configurations other than that shown in FIG. 1 are of course possible; however, it is important that the base element 10 of the support platform be securely mounted relative to the microscope and the microscope base.

Figure 2:
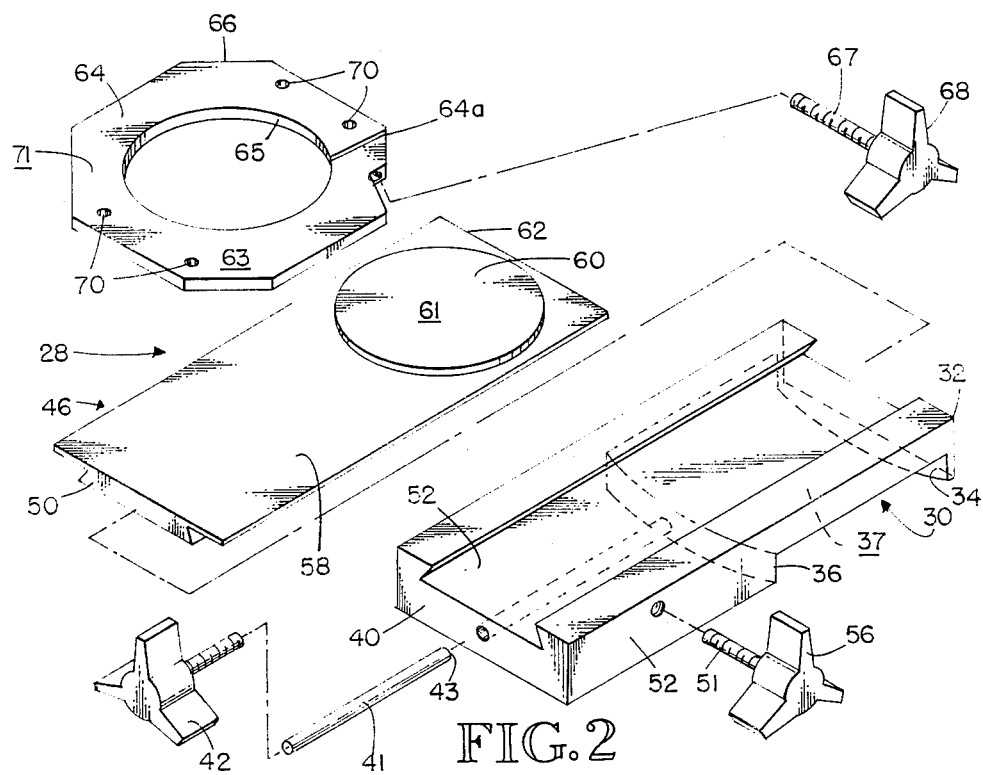
FIG. 2 is an exploded view of the positioner element portion of the support platform shown in FIG. 1.

Mounted on the upper surface 18 of annular portion 15 are one or more positioner elements 28. The positioner element 28 is shown in detail in FIGS. 2 and 3. Basically, positioner 28 is rectangular in configuration, approximately 3 inches wide and 5 inches long in the embodiment shown, with a relatively wide dovetail-like groove 30 in the bottom surface thereof. In the embodiment shown, the groove 30 is approximately 2 inches wide and ¼ inch deep, extends across the entire width of the positioner 28, and is located toward one end 32 of the positioner 28.

The opposing edges 34 and 36 defining the sides of groove 30 are both curved, matching the curve of the annular mounting portion 15 of the base element 10. Surface 37 defines the "bottom" of the groove. Edge 34 of the groove 30 is configured to mate with the inner edge 16 of annular mounting portion 15 while edge 36 of the groove is configured generally to mate with the outer edge 17 of the annular mounting portion 15. The surface 37 of the groove abuts the upper surface 18 of the annular mounting portion.

The positioner 28 is held in position relative to the upper surface 18 of the annular mounting portion 15, and hence the base element 10 as a whole, by means of a rod 41 which extends horizontally through the positioner 28 from end surface 40, against edge 17 of the annular mounting portion 15. The free end 43 of rod 41 can be tightened against edge 17 by means of a knob 42 which is positioned at the other end of the rod 41, adjacent the end surface 40 of the positioner 28.

The mating relationship of the groove 30 in the positioner 28 with the upper surface 18 of the annular mounting portion 15 permits reliable, stable rotational movement of the positioner 28 in a circle about the optical centerline of the microscope. The positioner in effect "orbits" about the optical centerline of the microscope. Hence, the present invention can be referred to as an orbital platform. When the positioner 28 is in a desired angular position, the knob 42 is tightened, thereby preventing further rotational movement of the positioner. The positioner is thus locked to the annular mounting portion 15 and base element 10 in that selected angular position.

Figure 3:
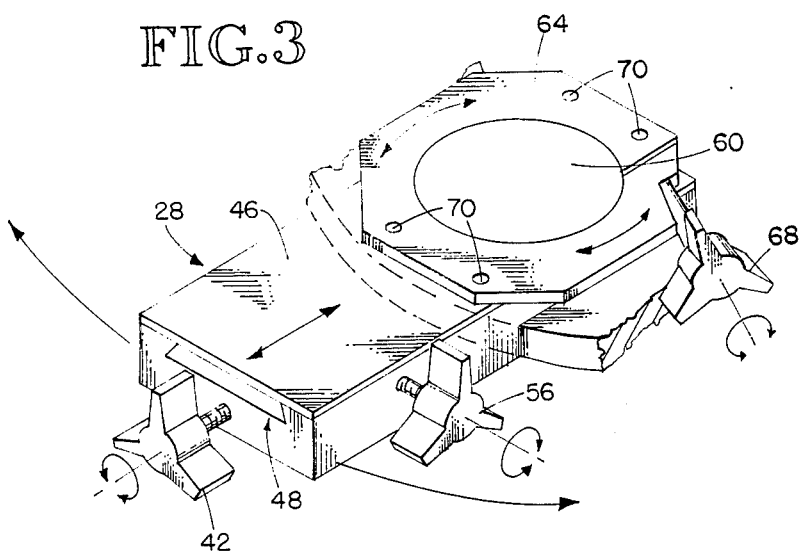
FIG. 3 is an isometric view of the positioner element shown in FIG. 3, showing the range of movement of selected parts of the positioner.

The positioner 28 includes a movable upper portion 46 which is slidable longitudinally relative to the remainder of the positioner 28. The upper portion 46 mates with the remainder of the positioner by means of a single wide dovetail 48 (FIG. 3). The lower surface of the upper portion 46 is formed into a tenon 50 (FIG. 2) which extends for substantially the full width of the upper portion, while the upper surface of the remainder of the positioner has the form of a mating mortise 52. The particular dovetail configuration shown may be changed, or other slidably engaging arrangements may be used in other embodiments of the invention.

The dovetail engagement described herein does provide a stable, reliable, slidable arrangement between upper portion 46 and the remainder of the positioner 28, permitting precise movements of the upper portion 46 in one direction, specifically, longitudinally of the remainder of the positioner and hence, directly toward and away from the centerline of the microscope. This particular direction of movement occurs in the embodiment shown because the positioner is mounted on the upper surface 18 of the annular mounting portion 15 and the upper surface 18 encircles the centerline 12 of the microscope, such that the horizontal centerline of the upper portion 46 of the positioner 28 extends through the vertical centerline 12 of the microscope, regardless of the angular position of the positioner 28.

It is important that the annular mounting portion 15 be so configured relative to the vertical centerline of the microscope and that the upper portion 46 be arranged relative to the remainder of the positioner 28 such that, as the positioner 28 is moved on the mounting portion 15 and the upper portion 46 of the positioner moved relative to the remainder thereof, that any probe which points to the centerline 12 in one angular position also points to the centerline in the other angular position.

The upper portion 46 of the positioner is secured relative to the remainder of the positioner 28 by a rod and knob arrangement similar to that described above for securing the entire positioner to the upper surface 18 of the annular mounting portion 15. The rod 51 extends horizontally through the side 52 of the positioner 28 and contacts the tenon portion 50 of the upper portion 46 of the positioner. The tightening/loosening of the rod 50 is accomplished by means of knob 56.

On the upper surface 58 of slidable upper portion 46 is a raised circular element 60. In the embodiment shown, the circular element 60 is approximately ¼ inch high, approximately 2½ inches in diameter, and is located toward one end 62 of upper surface 58. The circular element 60 either is a part of or is fixedly secured to upper surface 58. Rotatably positioned about the circular element 60 is a plate-like translator element 64. Translator 64 has a large central opening through which the circular element 60 extends. The top surface 61 of the circular element 60 is substantially coplanar with the top surface 63 of translator 64.

In the embodiment shown, the translator 64 is approximately ¼ inch thick, and has an outside edge configuration which is basically square, but with its corners cut diagonally, such that the translator 64 has somewhat of an octagonal outline. The configuration of the outer edge of translator 64, however, may differ. The translator 64 is rotatable relative to the circular element 60 and hence the positioner 28 as a whole. Translator 64 is not circumferentially continuous but includes a narrow gap 64a which extends through translator 64 between its inner and outer edges 65,66, respectively.

A threaded rod 67 extends horizontally through the translator and across the gap 64a. A knob 68 is attached to one end of the threaded rod 67. When the knob is rotated in one direction, the gap 63 closes because the closely adjacent gap edges of the translator 64 are drawn together, thereby tightening the entire translator against the circular element 60, preventing any rotational movement of the translator. When the knob 68 is rotated in the other direction, the translator is loosened, permitting rotational movement of the translator.

Located in the upper surface 71 of the translator element 64 are a number of holes 70—70, to which a conventional micromanipulator 73 (FIG. 1) may be secured. As discussed above, micromanipulators are well known as a microscope accessory, and are used to hold probes and similar elements for use in experiments involving cells and the like. One example of such a probe is an electrical probe which is held by the micromanipulator so as to make electrical contact with the cells, to permit the taking of electrical readings from the cell. The micromanipulator 73 conventionally includes a micrometer adjustment capability (not shown) for the probe. Such a micromanipulator is commercially available from Newport, Inc. The holes 70 in translator 64 are spaced in accordance with the particular micromanipulator used.

In operation, the micromanipulator is securely mounted on the translator 64. The translator 64 can be loosened as described above, and the micromanipulator can then be rotated about the circular element 60 by rotating the translator 64. Further, the dovetailed upper portion 46 of the positioner 28, when loosened, can be moved toward and away from the vertical center line of the microscope. Still further, the entire positioner may be rotated about the vertical centerline of the microscope on the upper surface 18 of the annular mounting portion 15.

Thus, the present invention provides a stable platform for mounting a micromanipulator used with a microscope. It provides the capability for controlled movement of the micromanipulator in several different directions relative to the microscope stage containing the element to be investigated. The invention also is capable of supporting a plurality of micromanipulators, from various manufacturers, on individual positioner elements, which can be controlled and moved independently of each other.

Although a preferred embodiment of the invention has been disclosed herein for illustration, it should be understood that various changes, modifications and substitutions may be incorporated in such embodiment without departing from the spirit of the invention as defined by the claims which follow.

We claim:

1. An apparatus for use with a microscope for mounting one or more micromanipulators capable of carrying an electrical probe or the like, comprising:
   a base element supported so that it is stable relative to a microscope, the microscope including a microscope stage portion on which is mounted an article being investigated, said base element being physically separate from and independent of the microscope stage portion and including a track portion which extends around a substantial portion of the microscope stage portion;
   at least one positioning element removably mounted on the track portion of said base element so that, in operation, said positioning element can be moved along said track portion and conveniently mounted on and removed from the track portion, said base element being configured and arranged so as to receive a variable number of positioning elements, each positioning element including a portion thereof which is movable relative to the remainder of the positioning element, toward and away from the microscope stage portion; and
   means on said movable portion of said positioning element for supporting a micromanipulator, wherein the means for supporting a micromanipulator is rotatable relative to said movable portion;
   wherein said positioning element is mounted on the base element such that the base element is beneath and thereby directly supports said positioning means and the micromanipulator located thereon.

2. An apparatus of claim 1, wherein said track portion is configured such that it remains the same distance from the optical axis of the microscope.

3. An apparatus of claim 1, wherein said track portion is horizontal and wherein the plane of movement of said movable portion of said positioning element and said support means is horizontal.

4. An apparatus of claim 1, wherein said base element is fixedly supported by the microscope itself.

5. An apparatus of claim 1, wherein said track portion of said base element extends substantially completely about the optical axis of the microscope and wherein the microscope stage portion is in the vicinity of the optical axis of the microscope.

6. An apparatus of claim 1, wherein said movable portion of said positioning element comprises an upper portion of said positioning element, and includes a tenon part on the lower surface thereof which dovetails with a mortise part on the upper surface of the remainder of said positioning element.

7. An apparatus of claim 1, including means for clamping said movable portion of said positioning element relative to the remainder thereof.

8. An apparatus of claim 1, wherein said support means is rotatable for 360 degrees and wherein the apparatus includes means for clamping the support means in a selected angular position 9. An apparatus of claim 8, including a circular element which extends upwardly from the top surface of said movable portion of said positioning element, wherein said support means is mounted about said circular element and rotates thereabout in operation.

* * * * *